Feb. 25, 1969  H. HERTEL  3,429,530
WINDOW CONSTRUCTION FOR FUSELAGES OF AIRCRAFT
Filed Nov. 8, 1966
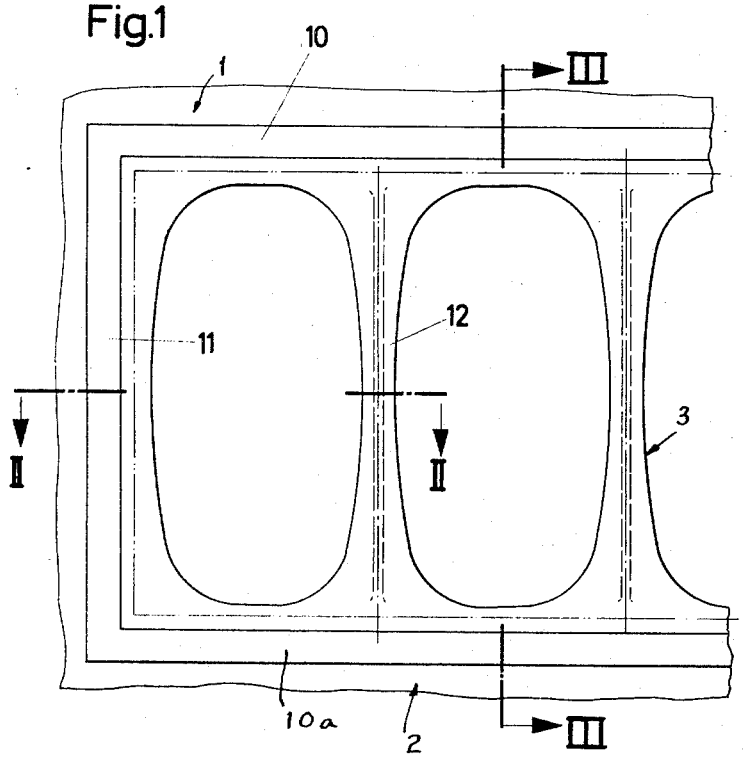
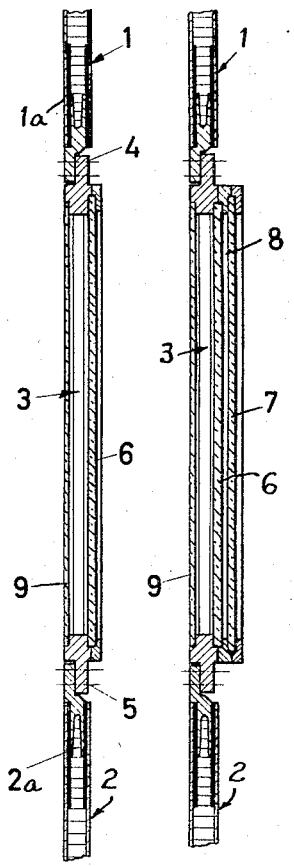
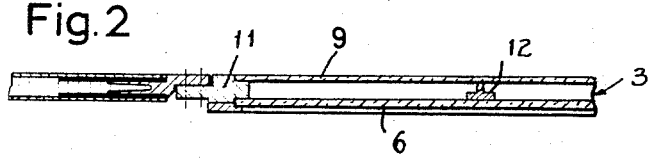
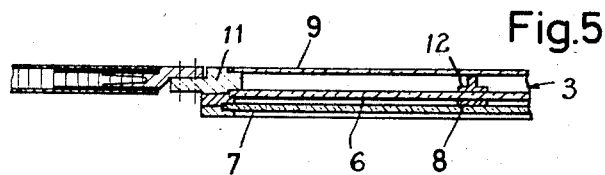
INVENTOR
HEINRICH HERTEL
BY Michael J. Striker
ATTORNEYS Feb. 25, 1969  H. HERTEL  3,429,530
WINDOW CONSTRUCTION FOR FUSELAGES OF AIRCRAFT
Filed Nov. 8, 1966
Fig.6
Fig.7
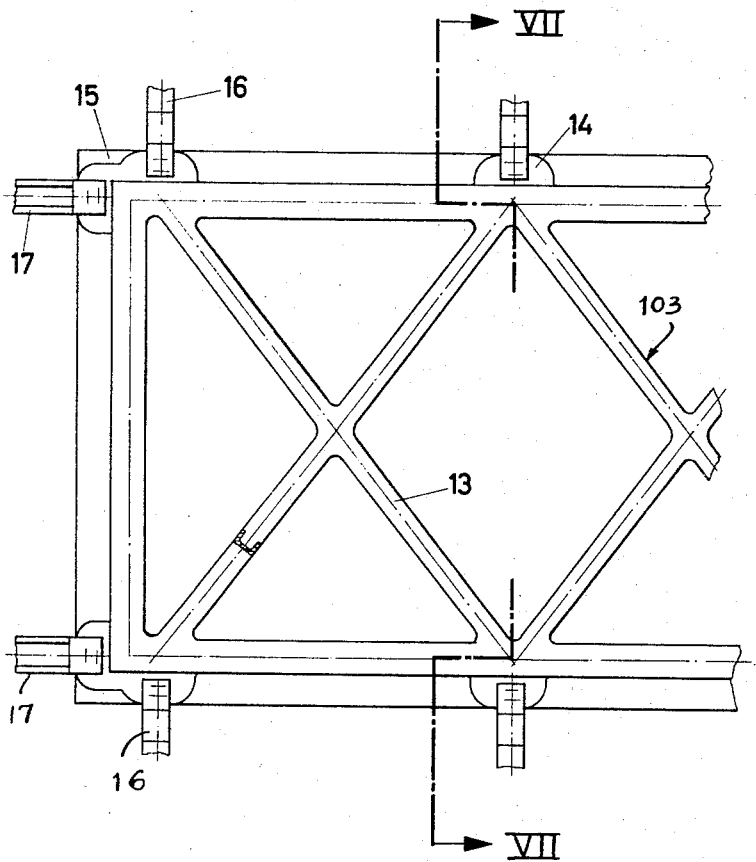
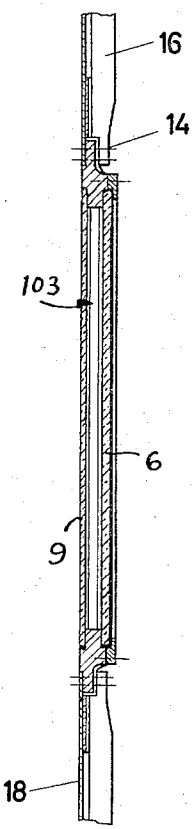
INVENTOR
HEINRICH HERTEL
BY
ATTORNEYS Feb. 25, 1969 H. HERTEL 3,429,530
WINDOW CONSTRUCTION FOR FUSELAGES OF AIRCRAFT
Filed Nov. 8, 1966
Fig.8
Fig.9
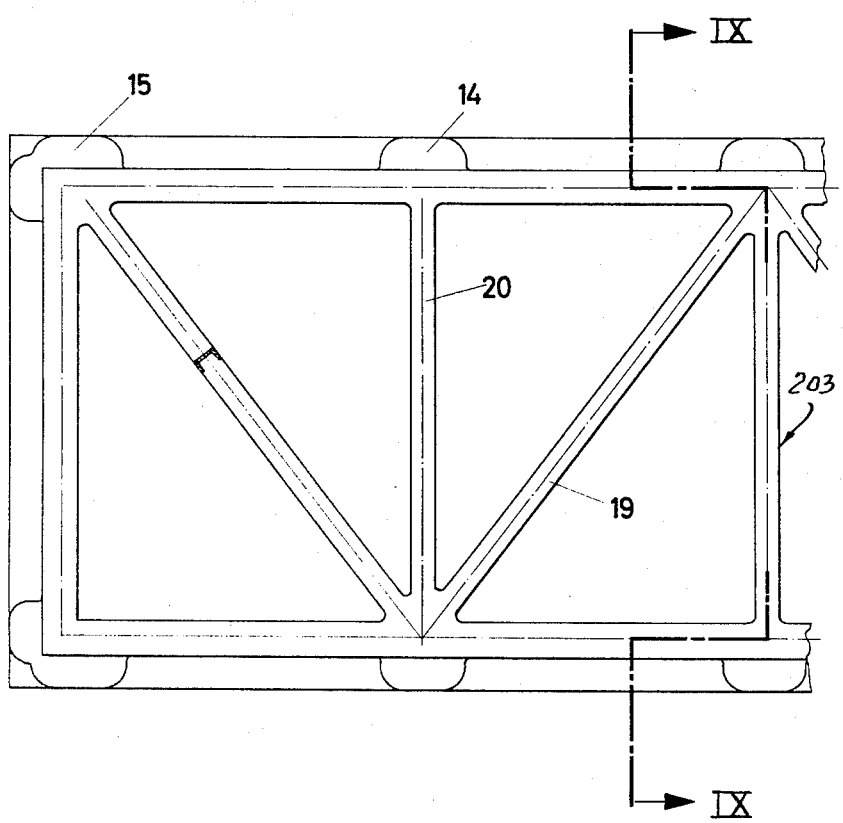
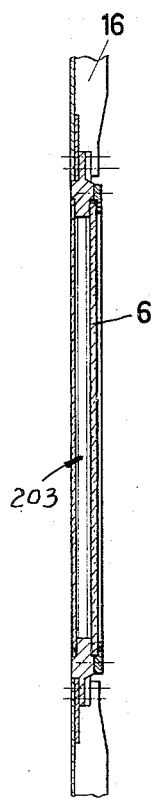
INVENTOR
HEINRICH HERTEL
BY
Michael J. Striker
ATTORNEYS

United States Patent Office 3,429,530
Patented Feb. 25, 1969

3,429,530
WINDOW CONSTRUCTION FOR FUSELAGES
OF AIRCRAFT
Heinrich Hertel, Tannenbergallee 361, Berlin 19, Germany
Filed Nov. 8, 1966, Ser. No. 592,769
Claims priority, application Germany, Nov. 10, 1965,
H 57,642
U.S. Cl. 244—129        10 Claims
Int. Cl. B64c 1/14

ABSTRACT OF THE DISCLOSURE

The fuselage of an aircraft is provided with an opening. An apertured grid is received in the opening and secured to the fuselage. At least one continuous window pane overlies all apertures of the grid.

---

The present invention relates to fuselages for aircraft, and more particularly to improvements is window constructions which are built into fuselages.

The fuselages of modern high altitude aircraft must be provided with pressurized cabins. The cabin pressure is permitted to drop only slightly below normal atmospheric pressure when the aircraft flies at high altitudes. The pressurization is effected by compressors and the fuselage must withstand the differential between cabin pressure and the pressure of air outside of the aircraft. Such differential often approximates or even exceeds 0.5 atmosphere absolute pressure. Therefore, the sections or shells of the fuselage preferably act not unlike diaphragms. As a rule, various modifications of basic stressed-skin construction are used in all modern types of high altitude aircraft.

It is well known that one of the most difficult problems facing the designers of fuselages is the transfer of loads around cutouts, such as windows, doors, hatches and others. The cutouts should not cause undue weakening of the fuselage whose interior is under so-called boiler pressure.

At the present time, windows are installed in separate cutouts or openings of the fuselage and the regions surrounding such cutouts are stiffened by window frames so that diaphragm stresses and other loads are transferred around the cutouts. The frames should provide fluid tight seals around the window panes and, in many instances, each window includes two or more panes so that at least one pane remains intact and prevents a drop in cabin pressure in the event of breakage of the remaining pane or panes. Complete destruction of a window would endanger the lives of occupants by permitting sudden drop in cabin pressure. Therefore, safety regulations of many countries contain provisions for windows with two or more panes.

In order to avoid undue increase in weight without sacrificing security, most manufacturers of aircraft utilize relatively small windows which prevents the occupants from enjoying the view, especially if the distribution of seats in the cabin is not in an optimum relationship to the distribution of windows. This will happen when a first-class cabin is converted to accommodate tourist-class or economy-class passengers, or vice versa.

Furthermore, the provision of individual windows brings about serious aerodynamic drawbacks. In many instances, the frames of individual windows are not flush with the skin of the fuselage so that there develop notches, protuberances, slots and other unevennesses which are especially dangerous in low-resistance stressed skin constructions.

Accordingly, it is an important object of the present invention to provide a novel window construction for fuselages of high altitude aircraft and to assemble the window construction in such a way that it improves the aerodynamic characteristics of the fuselage and enables the occupants to see more of the scenery around the aircraft.

Another object of the invention is to provide a window construction which can be installed in presently known types of fuselages, whose weight does not exceed the weight of presently known window constructions, and which is more readily sealable in its cutout than the windows presently used in the fuselages of high altitude aircraft.

Briefly stated, one feature of my invention resides in the provision of an aircraft, particularly a high-altitude passenger plane, comprising a fuselage provided with an opening or cutout whose area equals the area of a full row of windows on conventional aircraft, and a novel window construction including an apertured grid inserted into the cutout and having marginal portions affixed to the fuselage, and at least one preferably continuous one-piece transparent pane of safety glass or the like overlying the inner side of the grid. The grid may be constituted by a continuous rigid frame (e.g., a frame resembling a Vierendeel girder) or a truss and comprises stress transmitting members extending between its upper and lower chords.

The window construction preferably further comprises a transparent outer covering such as a skin or sheet overlying the outer side of the grid and flush with the skin of the fuselage.

The novel features which are considered as characteristic of the invention are set forth in particular in the appended claims. The improved window construction itself, however, both as to its mounting and its mode of operation, together with additional features and advantages thereof, will be best understood upon perusal of the following detailed description of certain specific embodiments with reference to the accompanying drawings, in which:

FIG. 1 is a fragmentary plan view of the inner side of a window construction which embodies one form of my invention;

FIG. 2 is a fragmentary horizontal section as seen in the direction of arrows from the line II—II of FIG. 1;

FIG. 3 is a vertical section as seen in the direction of arrows from the line III—III of FIG. 1;

FIG. 4 is a similar vertical section through a modified window construction with two panes;

FIG. 5 is a fragmentary horizontal section through the window construction of FIG. 4;

FIG. 6 is a fragmentary plan view of the inner side of a third window construction wherein the grid is constituted by a truss;

FIG. 7 is a vertical section as seen in the direction of arrows from the line VII—VII of FIG. 6;

FIG. 8 is a fragmentary plan view of the inner side of a fourth window construction which comprises a different truss including diagonal and vertical web members; and FIG. 9 is a vertical section as seen in the direction of arrows from the line IX—IX of FIG. 8.

Referring first to FIGS. 1 to 3, there is shown a portion of a fuselage which is a so-called stressed skin construction having an upper section or shell 1 and a lower section or shell 2. The skin on the shells 1 and 2 is indicated at 1a and 2a. In accordance with my present invention, the fuselage is formed with an elongated rectangular cutout or opening which replaces a whole row of individual cutouts and receives a novel window construction including an apertured strip-shaped frame or grid 3 whose upper and lower edge portions or chords 10, 10a are respectively fastened to the shells 1 and 2 as shown at 4 and 5. The grid 3 is fitted into its cutout from the inside and its inner side is covered by a continuous one-piece safety glass pane 6 which takes up the cabin pressure. The pane 6 lies flush against and transmits pressure to the components of the grid 3.

The outer side of the grid 3 is provided with a transparent sheet 9 which is flush with the skin 1a, 2a. The space between the sheet 9 and pane 6 is maintained at the pressure which prevails around the fuselage, i.e., the pressure at both sides of the sheet 9 is the same.

FIG. 1 shows that the apertures in the grid 3 are of substantially oval shape and are closely adjacent to each other so that the grid 3 actually constitutes a skeleton which allows for practically unimpeded observation of scenery regardless of the distribution of seats along the cutout. This grid reassembles a substantially rectangular strip having the aforementioned upper and lower edge portions or chords 10, 10a, vertically extending edge portions or web members 11 and vertical partitions or web members 12 between the adjoining apertures. The pane 6 abuts flush against the edge portions 10, 10a, 11 and also against the partitions 12. The parts 10, 11, 10a, 12 form a continuous rigid frame reasembling a Vierendeel girder. Such construction is ideally suited to take up stresses from the pane 6 and to transmit tangential stresses by the socalled columnar effect and transverse stresses by the socalled frame action.

FIGS. 4 and 5 illustrate a slightly different window construction with two panes 6 and 7. Both panes are continuous and are separated from each other by an intermediate network or grid 8 which registers with the grid 3. Twin window panes will be utilized where prescribed by authorities and as a safety measure. In this embodiment of my invention, the inner pane 7 takes up the cabin pressure and the pane 6 becomes effective only when the pane 7 is damaged or destroyed.

FIGS. 6 and 7 shows a window construction wherein the grid is constituted by a truss 103 having diagonal web members 13, for example, web members of U-shaped cross section as indicated in FIG. 6. The points 14, 15 of intersection between the web members 13 and the upper and lower chords of the truss 103 are extended beyond the chords so that they can be readily engaged and retained by the stiffening rings or bulkheads 16 and stringers 17 of the fuselage. The numeral 18 denotes the skin of the fuselage and this skin is flush with the transparent sheet 9 of the window construction. It will be seen tha the truss 103 defines three rows of apertures.

FIGS. 8 and 9 illustrate a modification of the structure shown in FIGS. 6 and 7. The diagonal web members 19 of the truss 203 provide shear-resistant connections between the upper and lower shells of the fuselage. The vertical web members 20 serve to transmit diaphragm forces. All of these web members and also the chords are in abutment with the preferably one-piece pane 6. The manner in which the points of intersection 14, 15 may be engaged by bulkheads 16 and stringers is the same as shown in FIGS. 6 and 7.

The opening or cutout for the window construction of my invention preferably extends along the full length or along the major part of the cabin, and one such cutout is provided at each side of the cabin. The grid 3, 103 or 203 can be produced by die casting, by machining or in another suitable way and preferably overlies the entire cutout. Each of the panes 6, 7 preferably consists of a single piece of safety glass. The cutouts will be provided at an optimum distance above the cabin floor to insure that the occupants of the cabin will be able to observe the scenery from any desired angle and from each seat, i.e., from the window seat, from the aisle seat and/or from the intermediate seat or seats. The skin of each window construction preferably includes a single piece of transparent sheet material 9.

It would appear, at a first glance, that the utilization of a grid as a substitute for a series of small window frames adds considerably to the overall weight of the fuselage. However, and since the static characteristics of a rigid framelike or truss-shaped grid and of a continuous window pane are far superior to the characteristics of presently known window constructions with individual panes and separate frames therefor, the weight of the improved window construction can be held within acceptable limits without sacrificing rigidity. Furthermore, a continuous window pane which lies flush against the components of the grid is much safer than a series of individual panes and cannot be ejected even if it develops minor or larger cracks. This is due to the large area of contact between the pane and its grid so that the window construction meets the requirements for a fail-safe operation. The stresses to which the pane is subjected due to differential in pressures at its inner and outer sides are transmitted to each component of the supporting grid so that the provision of a second window pane is a purely precautionary measure.

Another very important advantage of the improved widow construction is that the time required for its mounting in the fuselage is but a fraction of time needed to mount a series of individual windows. Also, the relatively large window construction can be more readily sealed around the edges and the cost of the fuselage is reduced if a single cutout therein can replace one or more rows of small cutouts for individual windows.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be within the invention.

What is claimed as new and desired to be protected by Letters Patent is:

1. An aircraft, comprising a fuselage defining an enclosed elongated cabin, said fuselage being provided with an elongated strip-shaped window opening extending longitudinally of said cabin and including upper and lower fuselage portions extending longitudinally of said window opening above and below the same, respectively; elongated strip-shaped frame means received in said window opening extending in direction of elongation thereof and having upper and lower longitudinally extending frame portions respectively affixed to said upper and lower fuselage portions, and stress-transmitting portions extending between said upper and lower frame portions at longitudinally spaced locations so as to define a plurality of apertures spaced longitudinally of said opening; and a continuous strip-shaped transparent window pane overlying said strip-shaped frame means at the inner side thereof.

2. An aircraft as defined in claim 1, wherein said frame means comprise a continuous rigid frame.

3. An aircraft as defined in claim 2, wherein said rigid frame is a Vierendeel girder.

4. An aircraft as defined in claim 1, wherein said fuselage has a skin; and further comprising a continuous transparent sheet applied to the outer side of said frame means and flush with said skin.

5. An aircraft as defined in claim 1, wherein said continuous window pane lies flush against the entire inner side of said frame means.

6. An aircraft as defined in claim 5; and a second continuous pane inwardly of said window pane and an intermediate grid between said panes, said panes lying flush against the respective sides of said intermediate grid.

7. An aircraft as defined in claim 6, wherein said intermediate grid registers with said frame means.

8. An aircraft as defined in claim 1, further comprising fastener means securing said frame means to the inner side of said fuselage.

9. An aircraft as defined in claim 1, wherein said opening is substantially rectangular.

10. An aircraft as defined in claim 1, wherein said apertures are arranged in at least one row.

References Cited

UNITED STATES PATENTS

| | | | |
|---|---|---|---|
| 639,320 | 12/1899 | Vierendeel | 14—7 |
| 1,677,577 | 7/1928 | Amiot | 52—731 |
| 2,613,402 | 10/1952 | Gouge | 52—507 |
| 2,659,686 | 11/1953 | Watkins | 52—208 |
| 3,101,819 | 8/1963 | Shinn | 189—37 |
| 3,307,316 | 3/1967 | Gray | 52—507 |
| 973,027 | 10/1910 | Fox | 52—622 |
| 2,599,138 | 6/1952 | Stewart | 105—397 |
| 3,064,380 | 11/1962 | Bant et al. | 52—311 |

FOREIGN PATENTS 151,461   5/1953   Australia.

MILTON BUCHLER, *Primary Examiner.*

J. E. PITTENGER, *Assistant Examiner.*

U.S. Cl. X.R.

105—396